US010621661B1

(12) United States Patent
Park

(10) Patent No.: US 10,621,661 B1
(45) Date of Patent: *Apr. 14, 2020

(54) SYSTEMS AND METHODS FOR AUTOMATIC ROUTE RE-DETERMINATION FOR AN UNMANNED AERIAL VEHICLE

(71) Applicant: Capital One Services, LLC, McLean, VA (US)

(72) Inventor: Kevin Park, Little Neck, NY (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/388,197

(22) Filed: Apr. 18, 2019

Related U.S. Application Data

(63) Continuation of application No. 16/185,642, filed on Nov. 9, 2018, now Pat. No. 10,319,030.

(51) Int. Cl.
*G05D 1/00* (2006.01)
*G05D 3/00* (2006.01)
(Continued)

(52) U.S. Cl.
CPC .............. *G06Q 40/02* (2013.01); *B64C 1/22* (2013.01); *B64C 39/024* (2013.01);
(Continued)

(58) Field of Classification Search
CPC .... G06Q 40/02; G06Q 10/08355; B64C 1/22; B64C 39/024; B64C 2201/128;
(Continued)

(56) References Cited

U.S. PATENT DOCUMENTS

| 5,663,548 A * | 9/1997 | Hayashi ............... G07B 15/063 235/375 |
| 10,319,030 B1 * | 6/2019 | Park ...................... G06Q 40/02 |

(Continued)

FOREIGN PATENT DOCUMENTS

| CN | 206491636 U | 9/2017 |
| CN | 107272743 A | 10/2017 |
| KR | 101811037 B1 | 12/2017 |

*Primary Examiner* — Khoi H Tran
*Assistant Examiner* — Jorge O Peche
(74) *Attorney, Agent, or Firm* — Finnegan, Henderson, Farabow, Garrett & Dunner, LLP

(57) ABSTRACT

The present disclosure relates to systems and methods for automatically re-routing unmanned aerial vehicles (UAVs). In one implementation, a system for automatically re-routing a UAV includes at least one processor configured to: retrieve a plurality of requests to deposit currency using the UAV, generate a first route including at least two of the requests such that an associated expected total amount of currency is less than a depository threshold; transmit the first route to the UAV; receive, from the UAV, an indication that an amount of currency collected at a location is greater than an amount of currency included in the request associated with the location; revise the expected total amount accordingly; when the revised expected total amount exceeds the depository threshold, generate a second route having an associated expected total amount below the depository threshold; and transmit the second route to the UAV to override the first route.

20 Claims, 9 Drawing Sheets

(51) Int. Cl.
*G06F 7/00* (2006.01)
*G06Q 40/02* (2012.01)
*B64C 1/22* (2006.01)
*B64C 39/02* (2006.01)
*G05D 1/02* (2020.01)
*G01S 19/42* (2010.01)
*G01C 21/00* (2006.01)
*G06Q 10/08* (2012.01)
*G01G 19/12* (2006.01)

(52) U.S. Cl.
CPC ............ *G01C 21/005* (2013.01); *G01S 19/42* (2013.01); *G05D 1/0202* (2013.01); *G06Q 10/08355* (2013.01); *B64C 2201/027* (2013.01); *B64C 2201/128* (2013.01); *G01G 19/12* (2013.01)

(58) Field of Classification Search
CPC . B64C 2201/027; G01S 19/42; G05D 1/0202; G01C 21/005; G01G 19/12
See application file for complete search history.

(56) References Cited

U.S. PATENT DOCUMENTS

| | | | |
|---|---|---|---|
| 2007/0129855 A1 | 6/2007 | Coulmeau | |
| 2014/0110219 A1* | 4/2014 | Higashiyama | G07G 1/12 194/216 |
| 2014/0149244 A1 | 5/2014 | Abhyanker | |
| 2014/0254896 A1* | 9/2014 | Zhou | B25J 9/0006 382/124 |
| 2015/0317597 A1 | 11/2015 | Shucker et al. | |
| 2016/0117931 A1* | 4/2016 | Chan | G08G 5/0043 701/120 |
| 2016/0225264 A1* | 8/2016 | Taveira | G05D 1/102 |
| 2016/0253907 A1* | 9/2016 | Taveira | G07B 15/00 701/3 |
| 2017/0015414 A1* | 1/2017 | Chan | B64C 39/024 |
| 2017/0015415 A1* | 1/2017 | Chan | B64C 39/024 |
| 2017/0083979 A1* | 3/2017 | Winn | H04L 67/12 |
| 2017/0160735 A1* | 6/2017 | Mikan | B64C 39/024 |
| 2017/0286892 A1* | 10/2017 | Studnicka | G06Q 20/26 |
| 2017/0355295 A1* | 12/2017 | Gutowitz | B60P 3/07 |
| 2018/0137495 A1* | 5/2018 | Pandey | G05D 1/0225 |
| 2018/0260867 A1* | 9/2018 | Lin | G06Q 30/0637 |
| 2018/0267904 A1* | 9/2018 | Kurian | G06F 3/0622 |

* cited by examiner

SYSTEMS AND METHODS FOR AUTOMATIC ROUTE RE-DETERMINATION FOR AN UNMANNED AERIAL VEHICLE

CROSS-REFERENCE TO RELATED APPLICATIONS

This application is a continuation of U.S. application Ser. No. 16/185,642, filed Nov. 9, 2018. The contents of the above are incorporated herein by reference.

TECHNICAL FIELD

This disclosure relates generally to the field of unmanned aerial vehicles. More specifically, and without limitation, this disclosure relates to systems and methods for automatically re-routing unmanned aerial vehicles.

BACKGROUND

The advent of unmanned aerial vehicles (UAVs) has resulted in a variety of uses for such automated vehicles, such as package delivery, food delivery, or the like. Aside from delivery, UAVs may be used for pick-up, e.g., pick-up of a returned item from a customer. In one particular use, a UAV may be adapted for pick-up of currency. Adopting a UAV for pick-up of currency may increase access for customers that are outside a reasonable range of a physical bank or other depository location and for customers that are unable to travel to a physical depository location on account of disabilities, lack of transportation, or the like.

Furthermore, using UAVs for pick-up of currency may reduce risks associated with human carriers of currency, such as armored vehicle drivers and other workers. However, pick-up of currency using a UAV results in a security vulnerability of UAV on account of the risk shifted away from human carriers. For example, there is an incentive to intercept UAVs performing currency pick-up on account of the possibility of obtaining large sums of currency.

SUMMARY

Disclosed systems and methods for automatically re-routing unmanned aerial vehicles based on depository thresholds solve the problems associated with using traditional UAVs for currency pick-up. For example, the disclosed systems and methods may minimize possible loss (and thus possible risk) to the UAV using automated rules. The automated rules may also optimize any re-routes to minimize disruption to other customers. Moreover, the disclosed systems and methods for accommodating on-demand pick-up requests solve the problems associated with using traditional UAVs for currency pick-up. For example, the disclosed systems and methods may use automated rules to allow for on-demand requests without increases in risk to the UAV by ensuring that depository thresholds are not exceeded. The automated rules may thus improve experiences of customers with on-demand requests.

According to an exemplary embodiment of the present disclosure, a system for automatically re-routing an unmanned aerial vehicle may comprise at least one memory storing instructions and at least one processor configured to execute the instructions to perform operations. The operations may comprise retrieving a plurality of requests to deposit currency, using the unmanned aerial vehicle and generating a first route. The first route may include at least two of the plurality of requests and may have an associated expected total amount of currency below a depository threshold. The operations may further comprise transmitting the first route to the unmanned aerial vehicle; receiving, from the unmanned aerial vehicle, an indication that an amount of currency collected at a location associated with one of the at least two requests is greater than an amount of currency included in the request associated with the location; revising the expected total amount of currency associated with the first route in accordance with the received indication; and, when the revised expected total amount of currency exceeds the depository threshold, generating a second route. The second route may have an associated expected total amount of currency below the depository threshold. The operations may further comprise transmitting the second route to the unmanned aerial vehicle to override the first route.

According to an exemplary embodiment of the present disclosure, an unmanned aerial vehicle may comprise at least one rotor having an associated control system; at least one memory storing instructions; and at least one processor configured to execute the instructions to perform operations. The operations may comprise receiving a first route including a plurality of requests to deposit currency with the unmanned aerial vehicle. Each request may have an associated location along the first route and an associated amount of currency. The operations may further comprise, using the associated control system, navigating along the first route using the at least one rotor; receiving, from at least one sensor of the unmanned aerial vehicle, an indication that an amount of currency deposited at one of the associated locations is greater than the associated amount of currency; in response to the indication, receiving a second route including a subset of the plurality of requests; and using the associated control system, navigating along the second route using the at least one rotor.

According to an exemplary embodiment of the present disclosure, a system for automatically re-routing an unmanned aerial vehicle may comprise at least one memory storing instructions and at least one processor configured to execute the instructions to perform operations. The operations may comprise retrieving a plurality of requests to deposit currency using the unmanned aerial vehicle. Each request may have an associated location and an associated amount of currency. The operations may further comprise generating a first route including at least two of the plurality of requests; transmitting the first route to the unmanned aerial vehicle; monitoring a location of the unmanned aerial vehicle along the first route; when the unmanned aerial vehicle is within a location threshold of an associated location of one of the at least two of the plurality of requests, requesting an indication of an amount of currency deposited from the unmanned aerial vehicle; in response to the request, receiving, from the unmanned aerial vehicle, an indication of the amount of currency deposited; when the indication of the amount of currency deposited is greater than the amount of currency associated with the location, determining whether a difference between the amount of currency deposited and the amount of currency associated with the location exceeds a depository threshold; when the difference exceeds the depository threshold, generating a second route including fewer requests than the first route; and transmitting the second route to the unmanned aerial vehicle to override the first route.

According to an exemplary embodiment of the present disclosure, a system for automatically re-routing an unmanned aerial vehicle may comprise at least one memory storing instructions and at least one processor configured to execute the instructions to perform operations. The operations may comprise transmitting a first route to an unmanned aerial vehicle. The first route may include at least one request for depositing currency using the unmanned aerial vehicle and may have an associated expected total amount of currency below a depository threshold. The operations may further comprise receiving, during the traversal of the first route by the unmanned aerial vehicle, a new request for depositing currency with the unmanned aerial vehicle; determining whether a sum of the expected total amount of currency and an amount of currency associated with the new request is below the depository threshold; and, when the sum is determined to be below the depository threshold, generating a second route. The second route may include the new request. The operations may further comprise transmitting the second route to the unmanned aerial vehicle to override the first route.

According to an exemplary embodiment of the present disclosure, an unmanned aerial vehicle may comprise at least one rotor having an associated control system; at least one memory storing instructions; and at least one processor configured to execute the instructions to perform operations. The operations may comprise receiving, from a remote server, a first route including a plurality of requests to deposit currency using the unmanned aerial vehicle. Each request may have an associated location along the first route and an associated amount of currency. The operations may further comprise, using the associated control system, navigating along the first route using the at least one rotor; receiving, from at least one sensor of the unmanned aerial vehicle, an indication that an amount of currency deposited at one of the associated locations is less than the associated amount of currency; in response to the indication, transmitting the indication to the remote server; receiving, from the remote server, a second route including at least one additional request; and using the associated control system, navigating along the second route using the at least one rotor.

According to an exemplary embodiment of the present disclosure, a system for automatically re-routing an unmanned aerial vehicle may comprise at least one memory storing instructions and at least one processor configured to execute the instructions to perform operations. The operations may comprise retrieving at least one request to deposit currency using the unmanned aerial vehicle; generating a first route including the at least one request; transmitting the first route to the unmanned aerial vehicle; receiving a new request for depositing currency with the unmanned aerial vehicle; determining whether the unmanned aerial vehicle is traversing the first route; when the unmanned aerial vehicle is determined to be traversing the first route, determining whether a sum of an expected total amount of currency associated with the first route and an amount of currency associated with the new request is below the depository threshold; when the sum is determined to be below the depository threshold, generating a second route including the new request; and transmitting the second route to the unmanned aerial vehicle to override the first route.

Additional embodiments of the present disclosure include non-transitory computer-readable media storing instructions that cause one or more processors to execute any of the methods disclosed herein.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings.

DETAILED DESCRIPTION

The disclosed embodiments relate to systems and methods for automatically re-routing unmanned aerial vehicles and for processing on-demand requests for unmanned aerial vehicles. Embodiments of the present disclosure may be implemented using one or more general purpose computers in communication with an unmanned aerial vehicle. Alternatively or concurrently, one or more special purpose computer may be built according to embodiments of the present disclosure using suitable circuit elements, e.g., one or more application-specific integrated circuits or the like, in communication with the unmanned aerial vehicle.

Figure 1:
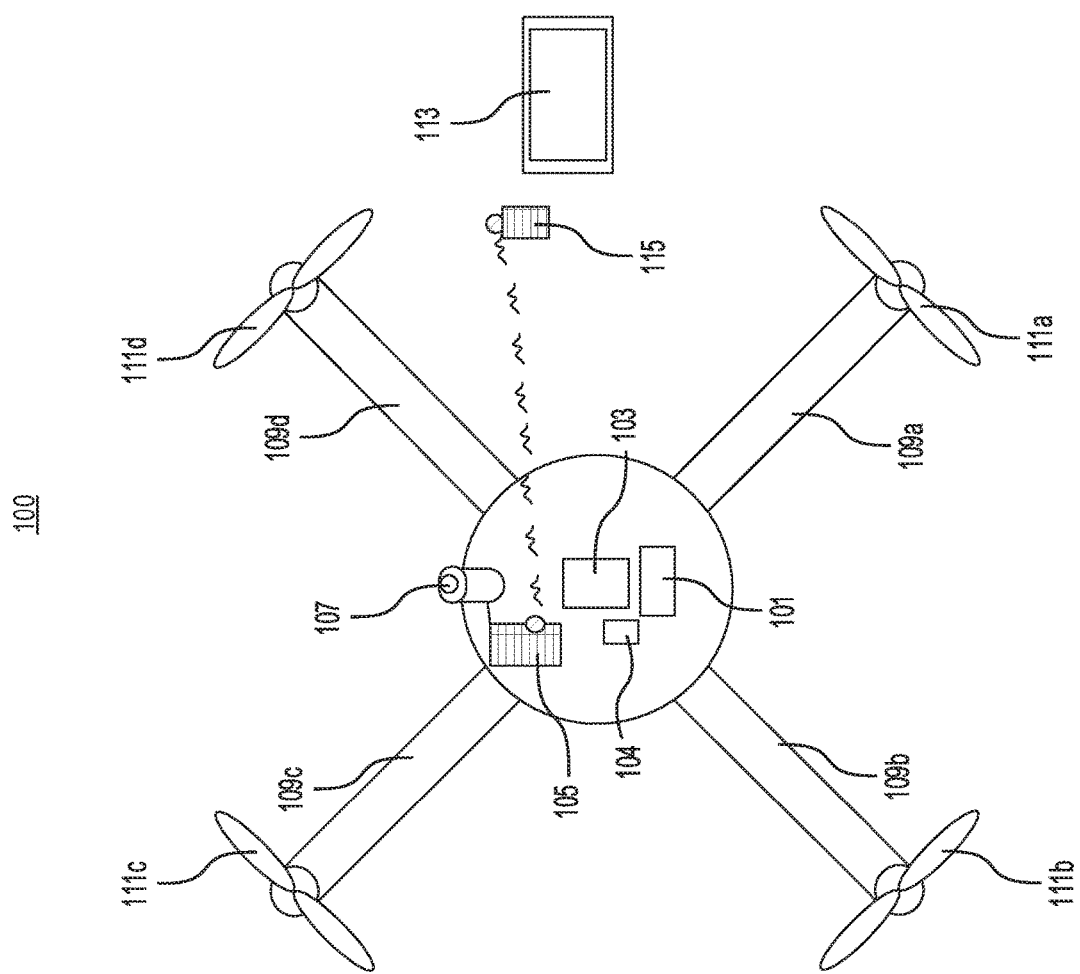
FIG. 1 is a schematic representation of an example unmanned aerial vehicle, consistent with embodiments of the present disclosure.

FIG. 1 is a schematic representation of an exemplary unmanned aerial vehicle (UAV) 100 for accepting deposits of currency. UAV 100 may include a slot 101 or any other receptacle for receiving currency from a customer. Slot 101 may be configured to accept coins, bills, envelopes (including bills and/or checks), or any combination thereof. In some embodiments, slot 101 may receive the currency using gravity. Additionally or alternatively, slot 101 may include an automated mechanism for drawing the coins, bills, and/or envelopes into UAV 100.

Once received, UAV 100 may store the currency in a storage component 103. Storage component 103 may be made of thick (e.g., at least 1" thick, at least 2" thick, or the like) metal (e.g., steel, iron, or the like). Storage component 103 may comprise a sealed container, such as a safe, that requires a key, a combination, a passcode, a biometric scan, or any other physical and/or digital authentication for access. Storage component 103 may connect to slot 101 via a one-way opening. For example, the one-way opening may comprise any mechanical or electrical mechanism that allows coins, bills, and/or envelopes to enter storage component 103 through the one-way opening but does not allow the coins, bills, and/or envelopes to exit storage component 103 through the same opening.

Although not depicted in FIG. 1, slot 101 and/or storage component 103 may include at least one sensor (e.g., sensor 104) for determining an amount of currency deposited on UAV 100. For example, sensor 104 may comprise a bill counter and/or a coin counter between slot 101 and storage component 103 and/or comprising at least a part of storage component 103. Additionally or alternatively, storage component 103 may include at least one scale configured to estimate currency amounts based on weight. Other mechanisms, for example, scanning or imaging the deposited currency, are also contemplated for determining the amount of deposited currency.

Although not depicted in FIG. 1, UAV 100 may include additional security measures. For example, UAV 100 may include a keypad, a fingerprint reader, a card reader, or any other input device by which a user may authenticate herself to UAV 100. In such embodiments, slot 101 may be closed to the user until she authenticates herself to UAV 100 by entering a known identifier, such as a personal identification number, a passcode, a password, or the like; allowing UAV 100 to read a known identifier, such as a magnetic strip card, a contactless card (e.g., using radio frequency identification (RFID) technology), a smartphone (e.g., using near-field communication (NFC) and/or Bluetooth®), or the like; by providing a biometric scan, such as a fingerprint scan, a facial scan, or the like; or any combination thereof. UAV 100 may authenticate the user using a processor included on UAV 100 and/or via communication with a remote server, as described below.

For example, in some embodiments, a user may undertake an "onboarding" or "registration" process using a smartphone, desktop computer, laptop computer, tablet, or any other type of computational and/or communications device. During such a process, the user may provide personal information (such as a name, an address, a social security number, or the like) that may be stored along with one or more identifiers of the user. Accordingly, a remote server (and/or UAV 100 itself) may store information provided during onboarding or registration and use the same when authenticating a user.

UAV 100 may include a transceiver 105. Although depicted as a single component, UAV 100 may include a separate receiver and a separate transmitter instead. Transceiver 105 may be configured for communication with a remote device, e.g., a remote server (such as server 800 of FIG. 8), a remote beacon (such as homing beacon), or the like. Transceiver 105 may transmit and receive over one or more radio frequencies and/or other light frequencies used for encoding of signals. Transceiver 105 may communicate using one or more standards, such as WiFi, 4G, long-term evolution (LTE), or the like.

In the example of FIG. 1, UAV 100 may include a camera 107. For example, camera 107 may be used in navigating UAV 100 in addition to or in lieu of a global positioning system (GPS) device (not shown). Additionally or alternatively, UAV 100 may use camera 107 to authenticate a user. For example, as explained above, a facial identification (or partial facial identification, such as eyes, nose, or the like) captured by camera 107 may authenticate user to UAV 100.

UAV 100 may further include one or more mechanisms for propulsion. In the example of FIG. 1, UAV 100 includes at least one rotor (e.g., rotors 109a, 109b 109c, and 109d) that drive at least one propeller (e.g., propellers 111a, 111b, 111c, and 111d, respectively). The at least one rotor may comprise part of an electric motor and/or part of a fuel combustion engine. One or more of the rotors may drive one or more of the propellers that provide lift while one or more of the rotors may drive one or more of the propellers that provide navigational capabilities (such as turning, lateral movement, rotational movement, or the like).

Although not depicted in FIG. 1, rotors 109a, 109b 109c, and/or 109d may be controlled using one or more control systems. For example, the control system(s) may comprise one or more transistors configured to set speeds of rotation of rotors 109a, 109b 109c, and/or 109d. In some embodiments, the control system(s) may control the speeds of rotation in accordance with navigational instructions (e.g., as received from remote controller 113, described below). Accordingly, the control system(s) may include a GPS component and/or other locator such that the control system(s) set the speeds of rotation such that UAV 100 navigates along a route implemented by the GPS component.

Although described using rotors and propellers, UAV 100 may use additional or alternative aerial technologies. For example, rocketry, jet engines, or the like may be used along with or in lieu of the rotor and propeller systems described above.

As explained above, UAV 100 may communicate with a remote server (such as server 800 of FIG. 8), a remote beacon (such as homing beacon), or the like. For example, as depicted in FIG. 1, UAV 100 may use transceiver 105 to send signals to and receive signals from a remote controller 113 (such as server 800 of FIG. 8). Controller 113 may thus use a transceiver 115 to communicate with the transceiver 105 of FIG. 1. As explained further below with respect to FIGS. 4, 5, 6, and 7, controller 113 may provide routes to UAV 100 for use in navigation, and UAV 100 may provide feedback regarding stops along the provided routes to controller 113.

Figure 2A:
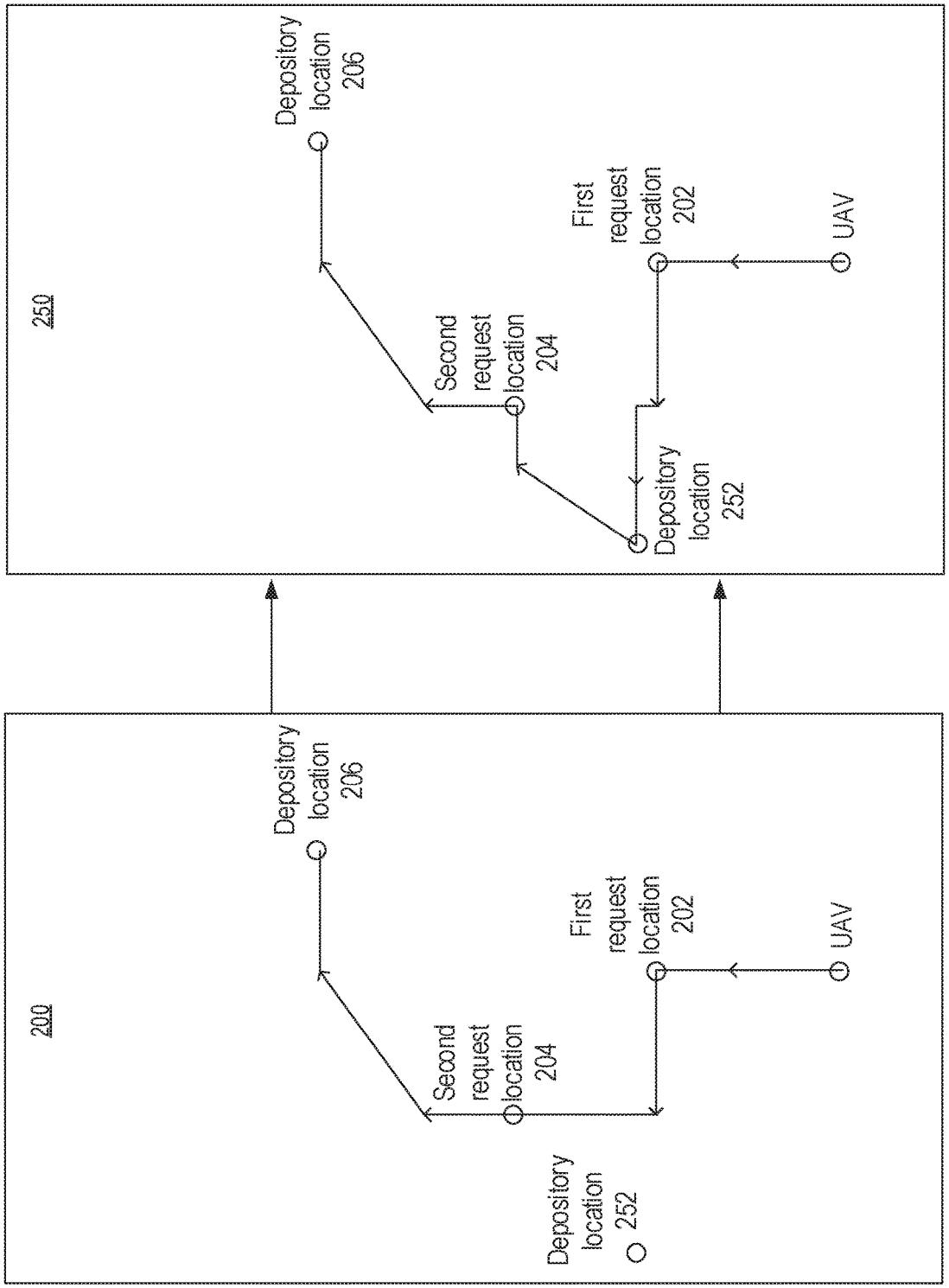
FIG. 2A is a graphical representation of an example route for an unmanned aerial vehicle modified to include a new depository location, consistent with embodiments of the present disclosure.

FIG. 2A depicts an exemplary graphical representation of a first route 200 that is modified to second route 250 in response to exceeding a depository threshold. For example, UAV 100 of FIG. 1 may receive first route 200 from remote controller 113 of FIG. 1 and traverse first route 200. First route 200 may include, for example, first request location 202, second request location 204, and depository location 206. Second route 250 may include, for example, first request location 202, depository location 252, second request location 204, and depository location 206. In the example of FIG. 2A, after stopping at first request location along first route 200, UAV 100 may provide feedback to remote controller 113, which may modify first route 200 into second route 250 and transmit second route 250 to UAV 100. Although described using remote controller 113, UAV 100 may additionally or alternatively use a processor included on UAV 100 to generate first route 200, process feedback after stopping at first request location along first route 200, and/or generate second route 250 in response to the processed feedback. After each deposit, UAV 100 (and/or remote controller 113) may store information regarding the deposit (such as a location of the deposit, an amount of the deposit, or the like) in a structured data format, such as tabular data, graphical data, or the like. For example, UAV 100 (and/or remote controller 113) may stored the information in one or more databases on a non-transitory storage medium accessible by the UAV 100 (and/or remote controller 113).

In the example of FIG. 2A, first route 200 includes two requests 202, 204 from customers to deposit currency with UAV 100. Each request may have an associated location (as depicted in FIG. 2A) and an associated amount of currency. For example, the associated amount of currency may comprise an amount included in the requests sent from devices associated with the customers to remote controller 113, UAV 100, or to a server in communication with remote controller 113 and/or UAV 100. Additionally or alternatively, the associated amount of currency may comprise an estimated amount based on historical data, e.g., an average, a median, or other statistically derived amount from previous deposits on UAV 100 (or another UAV in a same fleet as UAV 100) by the customer. Additionally or alternatively, the associated amount of currency may comprise an estimate based on one or more inputs, such as historical deposits of the customer (whether on UAV 100 or another UAV in the same fleet and/or at a physical depository location), a current balance one or more depository accounts associated with the customer, a zip code associated with the customer, an income associated with the customer, or the like.

Accordingly, if a deposit at the first request location or any request location exceeds the amount associated with that location, UAV 100 may generate an indication of the same (e.g., using the at least one sensor described above with respect to FIG. 1). Based on the indication, UAV 100 and/or remote controller 113 may generate second route 250 to include an additional stop at a depository location 252. Accordingly, UAV 100 may unload deposited currency at the additional depository location 252 before stopping at the second request location 204. Although the example of FIG. 2A includes the additional stop at a depository location 252 immediately after the request location having a deposit that exceeds the amount associated with that location, second route 250 may include the additional stop at depository location 252 during any appropriate portion of second route 250.

For example, in some embodiments, UAV 100 and/or remote controller 113 may generate second route 250 only if the additional deposit at the first request location 202 or any request location 202, 204 causes a total expected amount of deposits along first route 200 to exceed a depository threshold. In such an example, if the first request location deposited $50,000 rather than $40,000, and the second request location has an associated deposit amount of $25,000, UAV 100 and/or remote controller 113 may generate second route 250 only if the depository threshold is greater than $75,000. Moreover, the location of the additional stop at a depository location may depend on the depository threshold. For example, UAV 100 and/or remote controller 113 may generate second route 250 such that UAV 100 unloads deposited currency before the depository threshold is expected to be exceeded based on the expected deposit amounts associated with the request locations.

In some embodiments, UAV 100 and/or remote controller 113 may override the depository threshold based on a distance between one or more points along second route 250 and the additional depository location. For example, if the distance exceeds a distance threshold, UAV 100 and/or remote controller 113 may override the depository threshold such that UAV 100 is permitted to accept currency above the depository threshold before stopping at the additional depository location, if at all.

Although described above using two requests, the modification depicted in FIG. 2A may be applied to routes including any number of requests. Moreover, in some embodiments, second route 250 may eliminate one or more of the request locations not yet visited. For example, remote controller 113 may determine that a difference UAV in the same fleet as UAV 100 should visit the eliminated request location(s) rather than UAV 100.

Figure 2B:
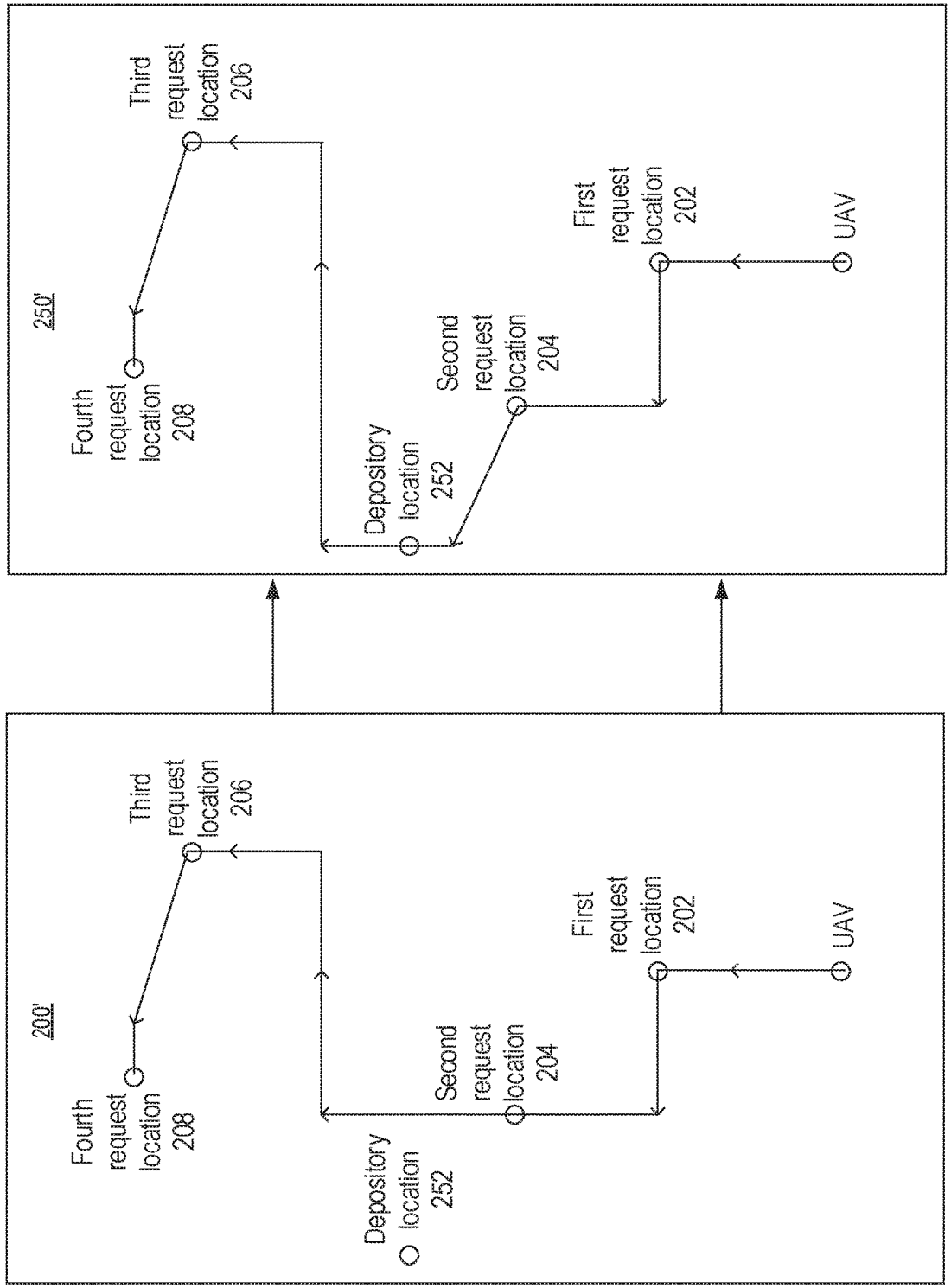
FIG. 2B is another graphical representation of an example route for an unmanned aerial vehicle modified to include a new depository location, consistent with embodiments of the present disclosure.

FIG. 2B depicts an exemplary graphical representation of a first route 200' that may be modified to second route 250' in response to factors in addition to or in lieu of a depository threshold. For example, UAV 100 of FIG. 1 may receive first route 200' from remote controller 113 of FIG. 1 and traverse first route 200'. First route 200 may include, for example, first request location 202, second request location 204, third request location 206, and fourth request location 208. Second route 250' may include, for example, first request location 202, second request location 204, depository location 252, third request location 206, and fourth request location 208. In the example of FIG. 2A, UAV 100 and/or remote controller 113 may determine that first request location 202 and second request location 204 are located in one cluster (e.g., Brooklyn) while third request location 206 and fourth request location 208 are located in a second cluster (e.g., Manhattan). Accordingly, based on a fuel (e.g., carbon-based fuel or battery power) capacity of UAV 100 and/or a predicted fuel consumption of UAV 100, UAV 100 and/or remote controller 113 may modify first route 200' into second route 250'. For example, UAV 100 and/or remote controller 113 may determine that a remaining amount of fuel, after servicing first request location 202 and/or second request location 204, is insufficient to reach fourth request location 208. UAV 100 and/or remote controller 113 may determine that the remaining amount of fuel is insufficient if there is (or is projected to be) no remaining fuel (e.g., empty fuel tank or battery) or when the remaining amount of fuel is below a safety threshold. Accordingly, UAV 100 and/or remote controller 113 may include depository location 252 to allow UAV 100 to re-fuel (or, in the case of a battery, re-charge). Additionally or alternatively, UAV 100 and/or remote controller 113 may determine that the remaining amount of fuel after first request location 202 and/or second request location 204 is insufficient to reach fourth request location 208. For example, UAV 100 and/or remote controller 113 may determine that the remaining amount of fuel may be exhausted or may reach a level below the safety threshold if UAV 100 continues to operate with the extra weight of currency collected at first request location 202 and/or second request location 204. For example, UAV 100 and/or remote controller 113 may monitor changes in fuel consumption in real-time and/or monitor average fuel consumption as a function of weight of UAV 100 increases. Based on the real-time or average fuel consumption, UAV 100 and/or remote controller 113 may determine that fuel efficiency has dropped such that UAV 100 cannot reach fourth request location 208 before the remaining amount of fuel is exhausted or falls to a level below a safety threshold. Accordingly, UAV 100 and/or remote controller 113 may include depository location 252 to allow UAV 100 to reduce its weight by transferring the currency collected at first request location 202 and/or second request location 204 to depository location 252 and/or to allow UAV 100 to re-fuel (or, in the case of a battery, re-charge).

In some embodiments, the capacity and/or predicted fuel consumption may be based on periodic or real-time measurements from one or more sensors included on UAV 100 (such as a fuel gauge, a voltmeter, or the like). In some exemplary embodiments in which remote controller 113 generates second route 250', remote controller 113 may transmit second route 250' to UAV 100.

Additionally or alternatively, UAV 100 and/or remote controller 113 may shift a depository threshold downward or upwards (i.e., increase or decrease the depository threshold) in response to one or more characteristics associated with first request location 202 and/or second request location 204. Accordingly, for example, based on a lowered depository threshold compared with associated amounts of currency for first request location 202, second request location 204, third request location 206, and/or fourth request location 208 (e.g., as described above with respect to FIG. 2A), remote controller 113 and/or UAV 100 may modify first route 200' into second route 250'.

For example, UAV 100 and/or remote controller 113 may shift the depository threshold downward in response to an increased chance of precipitation at or near first request location 202, second request location 204, third request location 206, and/or fourth request location 208. Alternatively, for example, UAV 100 and/or remote controller 113 may shift the depository threshold upward in response to an increased likelihood of sunshine at or near first request location 202, second request location 204, third request location 206, and/or fourth request location 208. Additionally or alternatively, for example, UAV 100 and/or remote controller 113 may shift the depository threshold downward in response to a crime rate associated with first request location 202, second request location 204, third request location 206, and/or fourth request location 208 being above a crime threshold. Similarly, for example, UAV 100 and/or remote controller 113 may shift the depository threshold upward in response to a crime rate associated with first request location 202, second request location 204, third request location 206, and/or fourth request location 208 being below the crime threshold. Additionally or alternatively, for example, UAV 100 and/or remote controller 113 may shift the depository threshold downward in response to a density of requests associated with two or more of first request location 202, second request location 204, third request location 206, and/or fourth request location 208 being above a density threshold. Similarly, for example, UAV 100 and/or remote controller 113 may shift the depository threshold upward in response to a density of requests associated with first request location 202, second request location 204, third request location 206, and/or fourth request location 208 being below the density threshold. Accordingly, in any of the embodiments described herein, the depository threshold may be dynamically changeable based on one or more characteristics associated with one or more request locations.

Figure 3:
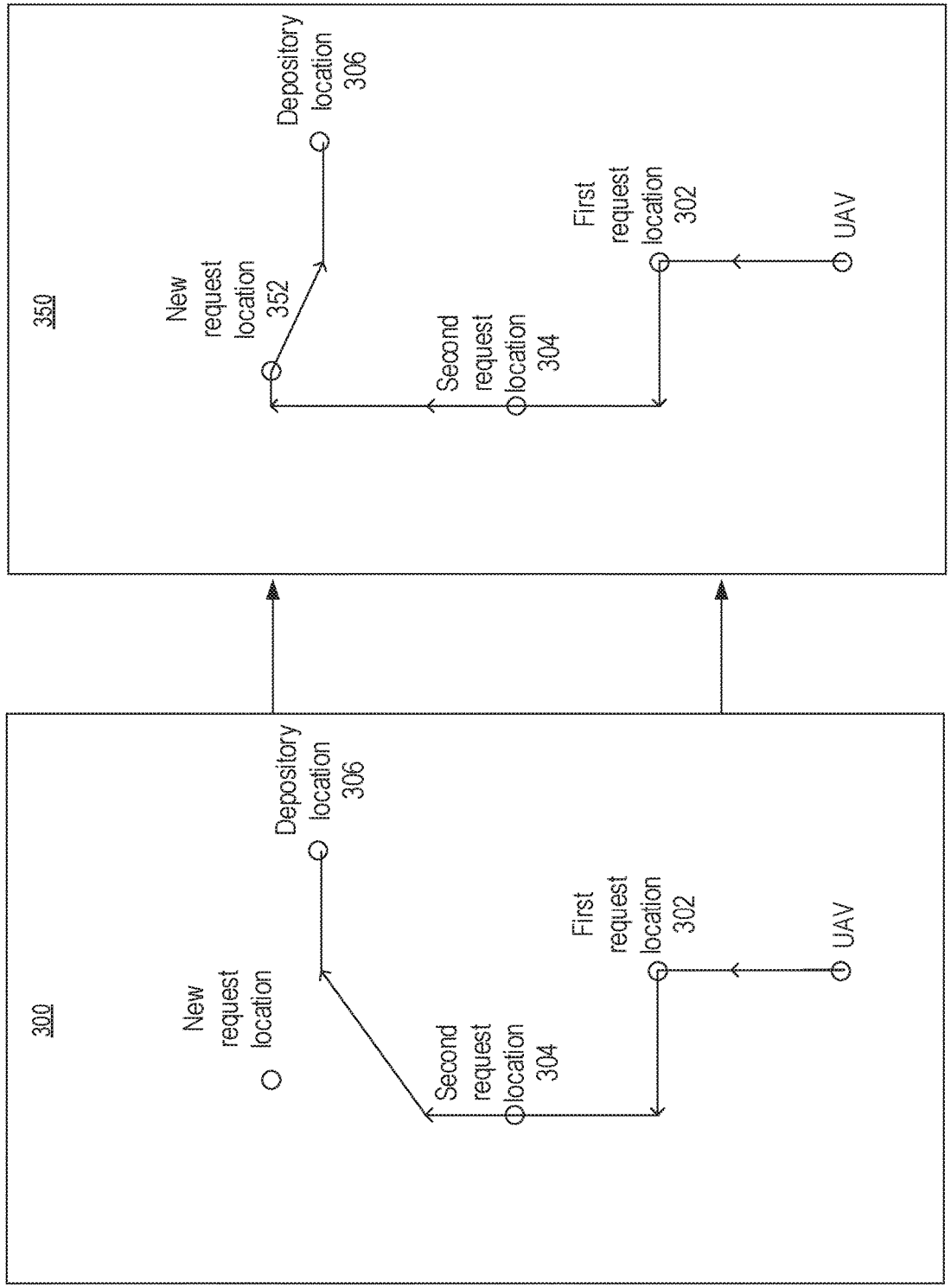
FIG. 3 is a graphical representation of an example route for an unmanned aerial vehicle modified to include a new request location, consistent with embodiments of the present disclosure.

FIG. 3 depicts an example graphical representation of a first route 300 that is modified to second route 350 in response to smaller-than-expected deposits. First route 300 may include, for example, first request location 302, second request location 304, and depository location 306. Second route 350 may include, for example, first request location 302, second request location 304, new request location 352, and depository location 306. For example, UAV 100 of FIG. 1 may receive first route 300 from remote controller 113 of FIG. 1 and traverse first route 300. In the example of FIG. 3, after stopping at second request location along first route 300, UAV 100 may provide feedback to remote controller 113, which may modify first route 300 into second route 350 and transmit second route 350 to UAV 100. Although described using remote controller 113, UAV 100 may additionally or alternatively use a processor included on UAV 100 to generate first route 300, process feedback after stopping at second request location along first route 300, and/or generate second route 350 in response to the processed feedback.

In the example of FIG. 3, first route 300 includes two requests 302, 304 from customers to deposit currency with UAV 100. Each request may have an associated location (as depicted in FIG. 3) and an associated amount of currency. For example, the associated amount of currency may comprise an amount included in the requests sent from devices associated with the customers to remote controller 113, UAV 100, or to a server in communication with remote controller 113 and/or UAV 100. Additionally or alternatively, the associated amount of currency may comprise an estimated amount based on historical data, e.g., an average, a median, or other statistically derived amount from previous deposits on UAV 100 (or another UAV in a same fleet as UAV 100) by the customer.

Accordingly, if a deposit at the first request location or any request location is smaller than the amount associated with that location, UAV 100 may generate an indication of the same (e.g., using the at least one sensor described above with respect to FIG. 1). Based on the indication, UAV 100 and/or remote controller 113 may generate second route 350 to include an additional location 352 associated with a new request. Accordingly, UAV 100 may accept a deposit at the new request location 352 before stopping at the depository location 306. Although the example of FIG. 3 includes the additional stop at the new request location 352 before stopping at the depository location 306, second route 350 may include the stop at the new request location 352 during any portion of the second route 350.

For example, in some embodiments, UAV 100 and/or remote controller 113 may generate second route 350 only if the expected amount of deposit at the new request location 352 does not cause a total expected amount of deposits along second route 350 to exceed a depository threshold. In such embodiments, detecting a smaller-than-expected deposit, as described above, may be optional. For example, in some embodiments, the new request location 352 may be added as long as the expected amount of deposit at the new request location 352 does not cause a total expected amount of deposits along second route 350 to exceed the depository threshold.

Although described above using one additional request with two existing requests, the modification depicted in FIG. 3 may be applied to routes including any number of additional requests in combination with any number of existing requests.

Figure 4:
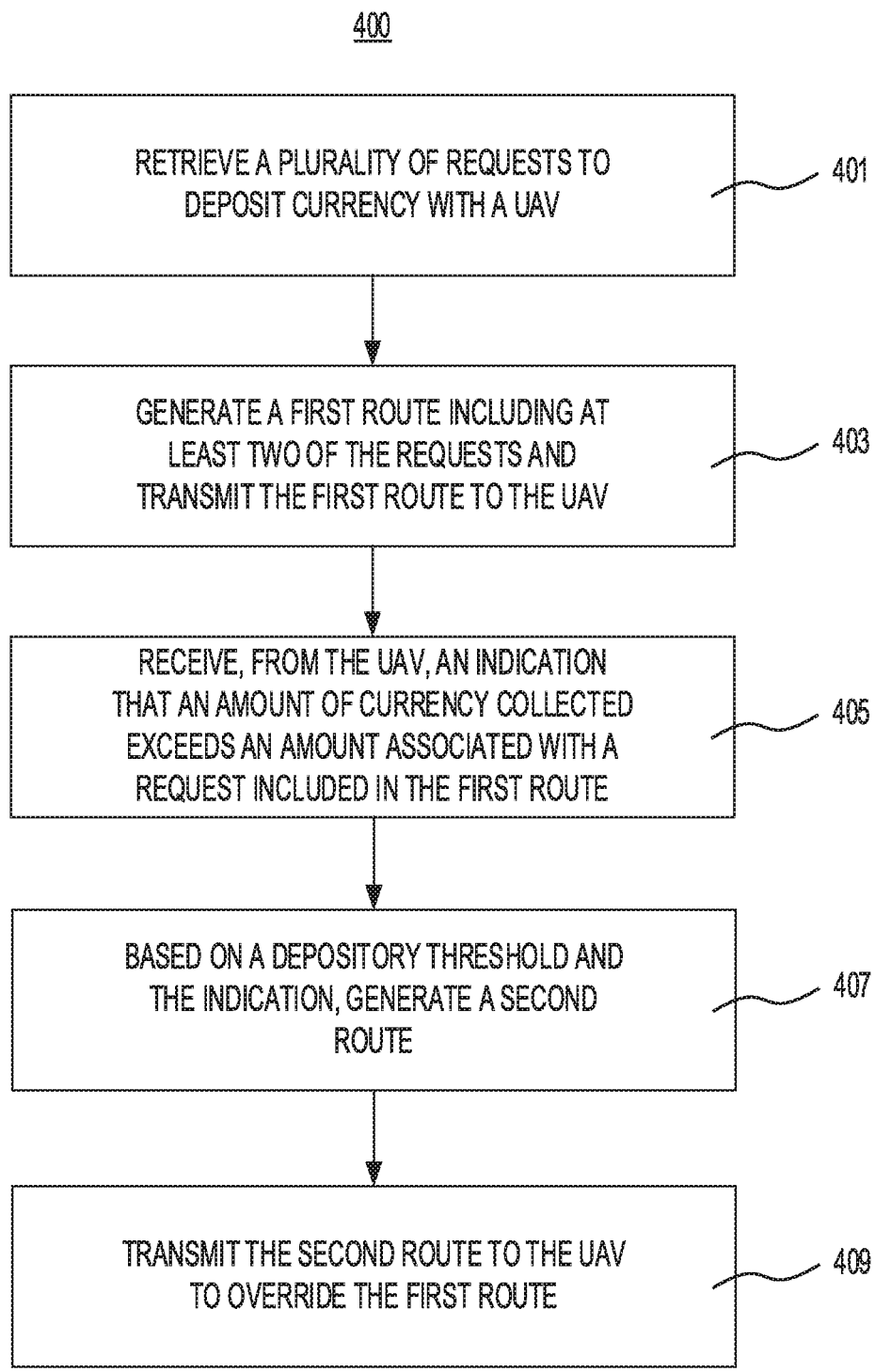
FIG. 4 is a flowchart of an exemplary method for re-routing an unmanned aerial vehicle in response to exceeding a depository threshold, consistent with embodiments of the present disclosure.

FIG. 4 is a flowchart of exemplary method 400 for automatically re-routing an unmanned aerial vehicle (e.g., UAV 100 of FIG. 1) based on a depository threshold. Exemplary method 400 may be implemented by, for example, one or more processors of UAV 100 of FIG. 1 and/or server 800 of FIG. 8 in communication with UAV 100 of FIG. 1. Exemplary method 400 may further be implemented using a general purpose computer or special purpose computer having at least one processor.

At step 401, the processor (e.g., processor 801 of server 800 of FIG. 8) may retrieve a plurality of requests to deposit currency with the unmanned aerial vehicle (e.g., UAV 100). For example, each request may have an associated location and an associated amount of currency. The processor may receive the requests, e.g., over a computer network (such as the Internet, a local area network (LAN), or the like) from devices associated with customers and store the requests for retrieval. Alternatively, a separate processor (e.g., associated with a different server) may receive the requests and store the requests for retrieval. Accordingly, retrieving the plurality of requests may comprise extracting, from an external storage device (e.g., database(s) 815 of FIG. 8), the plurality of requests previously received from a plurality of devices associated with customers. Additionally or alternatively, the requests may comprise a plurality of regularly scheduled pick-ups with associated locations. Thus, the associated amount of currency may comprise an amount included in the request or an amount determined from historical data, e.g., an average, a median, or other statistical determination from previous pick-ups at the associated locations.

At step 403, the processor (e.g., processor 801 of server 800 of FIG. 8) may generate a first route (e.g., route 200 of FIG. 2A) including at least two of the plurality of requests. The processor may generate the first route using at least one of Dijkstra's algorithm, a Bellman-Ford algorithm, an A* search algorithm, a Floyd-Warshall algorithm, Johnson's algorithm, a Viterbi algorithm, or the like. Thus, the first route may comprise a shortest path passing through the locations associated with the at least two requests (e.g., first request location 202 and second request location 204 of FIG. 2A).

Furthermore, the first route may have an associated expected total amount of currency below a depository threshold. For example, the expected total amount may comprise a sum of the amounts associated with the at least two requests included in the first route.

Further at step 403, the processor (e.g., processor 801 of server 800 of FIG. 8) may transmit the first route to the unmanned aerial vehicle (e.g., UAV 100). For example, the processor may transmit the first route (e.g., route 200 of FIG. 2A) using one or more standards, such as 4G, LTE, WiFi, or the like over one or more computer networks. In some embodiments, the first route (e.g., route 200 of FIG. 2A) may be encrypted. In some embodiments, the transmitted first route (e.g., route 200 of FIG. 2A) may comprise a series of global positioning system (GPS) coordinates defining a path for the unmanned aerial vehicle (e.g., UAV 100).

At step 405, the processor (e.g., processor 801 of server 800 of FIG. 8) may receive, from the unmanned aerial vehicle (e.g., UAV 100), an indication that an amount of currency collected at a location (e.g., location 202 or 204 of FIG. 2A) associated with one of the at least two requests is greater than an amount of currency included in the request. For example, the UAV (e.g., UAV 100) may determine the amount of currency collected using at least one sensor (e.g., sensor 104 of UAV 100), as explained above with respect to FIG. 1. Thus, the UAV (e.g., UAV 100) may compare the determined amount of currency collected to the amount included in the request (e.g., that was included with the first route (e.g., route 200 of FIG. 2A) transmitted to the UAV (e.g., UAV 100)) and transmit a result of the comparison to the processor (e.g., processor 801 of server 800 of FIG. 8).

Alternatively, at step 405, the processor (e.g., processor 801 of server 800 of FIG. 8) may receive, from the unmanned aerial vehicle (e.g., UAV 100), an indication of the amount of currency deposited, and the processor may determine whether a difference between the amount of currency deposited and the amount of currency associated with the location exceeds a depository threshold. Thus, the UAV (e.g., UAV 100) may transmit measurements from the at least one sensor (e.g., sensor 104 of UAV 100) to the processor (e.g., processor 801 of server 800 of FIG. 8) and/or may process the measurements to determine the amount of currency collected and transmit the determined amount of currency collected.

Figure 8:
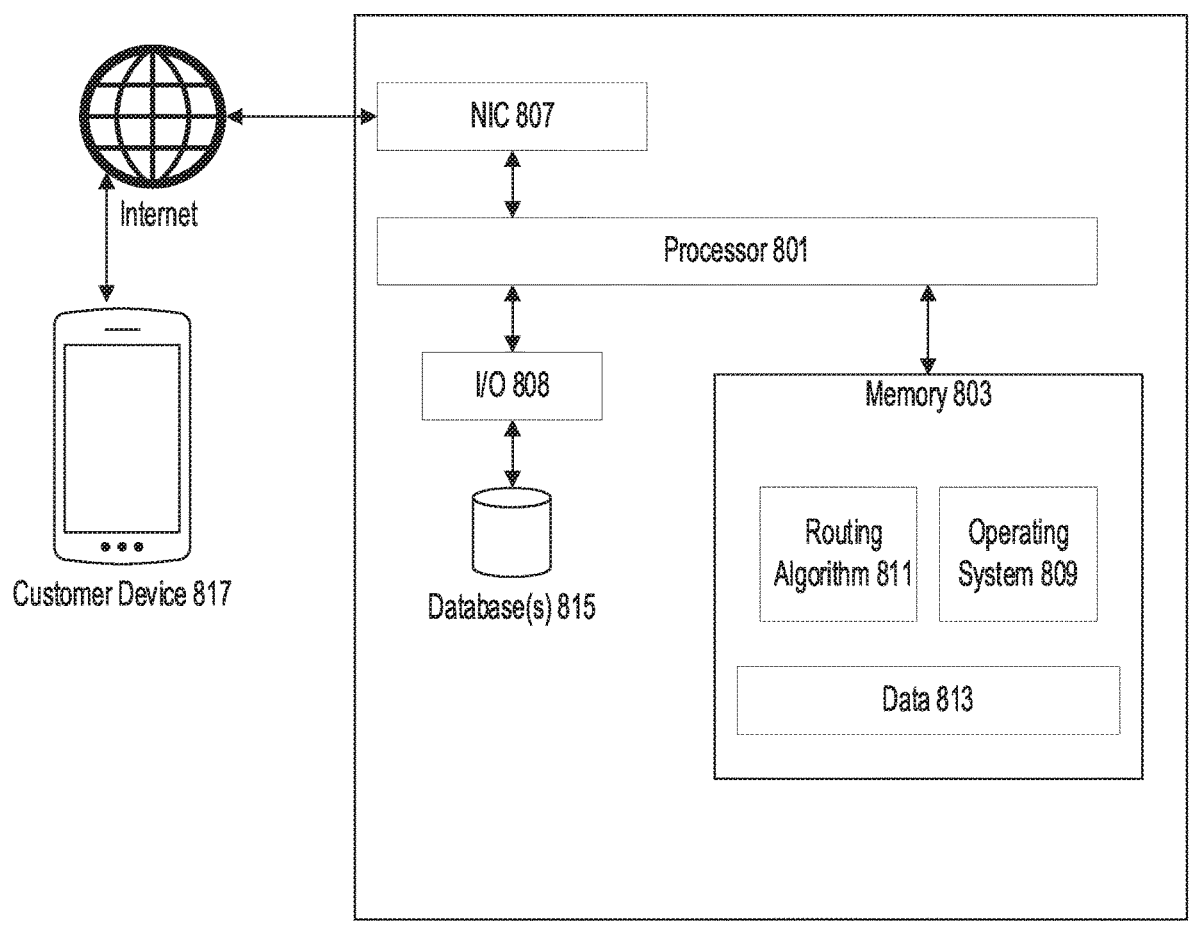
FIG. 8 is a depiction of an exemplary server for executing methods consistent with the present disclosure.

In any of the embodiments described above, the processor e.g., processor 801 of server 800 of FIG. 8) may revise the expected total amount of currency associated with the first route (e.g., route 200 of FIG. 2A) in accordance with the received indication. For example, the processor (e.g., processor 801 of server 800 of FIG. 8) may increase the expected total amount by the difference between the amount of currency deposited and the amount of currency associated with the location (e.g., location 202 of 204 of FIG. 2A).

At step 407, based on the indication and a depository threshold, the processor (e.g., processor 801 of server 800 of FIG. 8) may generate a second route (e.g., second route 250 of FIG. 2A). For example, when the revised expected total amount of currency exceeds the depository threshold, the processor (e.g., processor 801 of server 800 of FIG. 8) may generate a second route (e.g., route 250 of FIG. 2A) having an associated expected total amount of currency below the depository threshold. Additionally or alternatively, when the difference between the amount of currency deposited and the amount of currency associated with the location exceeds the depository threshold, the processor (e.g., processor 801 of server 800 of FIG. 8) may generate a second route (e.g., route 250 of FIG. 2A) including fewer requests than the first route (e.g., route 200 of FIG. 2A).

Similarly to the first route (e.g., route 200 of FIG. 2A), the processor (e.g., processor 801 of server 800 of FIG. 8) may generate the second route (e.g., route 250 of FIG. 2A) using at least one of Dijkstra's algorithm, a Bellman-Ford algorithm, an A* search algorithm, a Floyd-Warshall algorithm, Johnson's algorithm, a Viterbi algorithm, or the like. Thus, the second route (e.g. route 250 of FIG. 2A) may comprise a shortest path passing through the locations associated with requests included in the second route (e.g., route 250 of FIG. 2A) (and any depository locations, as explained above with respect to FIG. 2A). The processor (e.g., processor 801 of server 800 of FIG. 8) may use the same algorithm(s) used to generate the first route (e.g., route 200 of FIG. 2A) or may use one or more different algorithms.

At step 409, the processor (e.g., processor 801 of server 800 of FIG. 8) may transmit the second route (e.g., route 250 of FIG. 2A) to the unmanned aerial vehicle (e.g., UAV 100) to override the first route. For example, the processor (e.g., processor 801 of server 800 of FIG. 8) may transmit the second route (e.g., route 250 of FIG. 2A) using one or more standards, such as 4G, LTE, WiFi, or the like over one or more computer networks. In some embodiments, the second route (e.g., route 250 of FIG. 2A) may be encrypted. Similarly to the first route (e.g., route 200 of FIG. 2A), in some embodiments, the transmitted second route (e.g., route 250 of FIG. 2A) may comprise a series of global positioning system (GPS) coordinates defining a path for the unmanned aerial vehicle (e.g., UAV 100). As explained above with respect to FIG. 2A, the second route (e.g., route 250 of FIG. 2A) may include a stop at a depository location (e.g., location 252 of FIG. 2A) prior to other locations (e.g. locations 202, 204, and/or 206 of FIG. 2A) included in the first route (e.g., route 200 of FIG. 2A) and not yet visited by the unmanned aerial vehicle (e.g., UAV 100). Additionally or alternatively, as explained above with respect to step 407, the second route (e.g., route 250 of FIG. 2A) may include fewer requests than the first route (e.g., route 200 of FIG. 2A). In such embodiments, the processor (e.g., processor 801 of server 800 of FIG. 8) may transmit a new route including requests from the first route omitted in the second route to a different UAV.

Additionally or alternatively, method 400 may include monitoring a location of the unmanned aerial vehicle (e.g., UAV 100) along the first route. In such embodiments, the processor (e.g., processor 801 of server 800 of FIG. 8) may request an indication of an amount of currency collected at a location (e.g., location 202 or 204 of FIG. 2A) associated with one of the at least two requests (and, thus, an amount of currency deposited with the unmanned aerial vehicle (e.g., UAV 100)) when the unmanned aerial vehicle (e.g., UAV 100) is within a location threshold of the associated location. For example, the monitored location may comprise global positioning system (GPS) coordinates of the UAV (e.g., UAV 100). The processor (e.g., processor 801 of server 800 of FIG. 8) may send the request for the indication of the amount of currency collected when the monitored location is less than a distance threshold from the location (e.g., location 202 or 204 of FIG. 2A) associated with one of the at least two requests.

Figure 5:
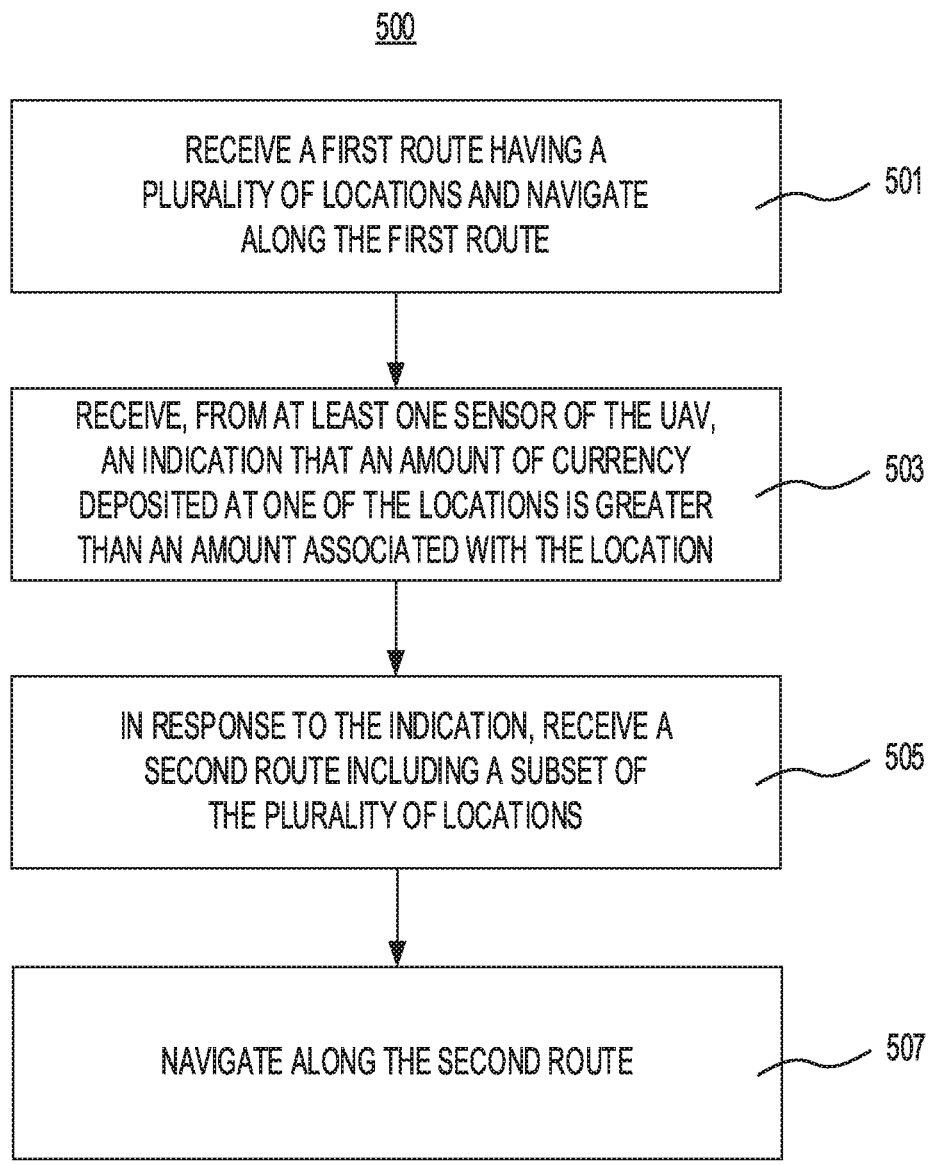
FIG. 5 is a flowchart of an exemplary method for navigating an unmanned aerial vehicle with a depository threshold, consistent with embodiments of the present disclosure.

FIG. 5 is a flowchart of exemplary method 500 for navigating an unmanned aerial vehicle (e.g., UAV 100 of FIG. 1) in response to a depository threshold. Exemplary method 500 may be implemented by, for example, one or more processors of UAV 100 of FIG. 1 and/or server 800 of FIG. 8 in communication with UAV 100 of FIG. 1. Exemplary method 500 may further be implemented using a general purpose computer or special purpose computer having at least one processor.

At step 501, the processor (e.g., a processor of UAV 100 of FIG. 1) may receive a first route having a plurality of locations. For example, the first route (e.g., route 200 of FIG. 2A) may include a plurality of requests to deposit currency with the unmanned aerial vehicle (e.g., UAV 100), each request having an associated location along the first route (e.g., first request location 202, second request location 204, or the like). Moreover, each request may have an associated amount of currency. The processor (e.g., a processor of UAV 100 of FIG. 1) may receive the first route (e.g., route 200 of FIG. 2A) using one or more standards, such as 4G, LTE, WiFi, or the like over one or more computer networks. In some embodiments, the first route (e.g., route 200 of FIG. 2A) may be encrypted. In some embodiments, the received first route (e.g., route 200 of FIG. 2A) may comprise a series of global positioning system (GPS) coordinates defining a path for the unmanned aerial vehicle (e.g., UAV 100).

Further at step 501, using an associated control system, the processor (e.g., a processor of UAV 100 of FIG. 1) may navigate along the first route (e.g., route 200 of FIG. 2A). For example, as explained above with respect to FIG. 1, the processor (e.g., a processor of UAV 100 of FIG. 1) may use at least one rotor (e.g., rotor 109a, 109b, 109c, and/or 109d) of the UAV (e.g., UAV 100) to navigate.

In some embodiments, the associated control system may include a navigational system comprises a global positioning system (GPS) component and a communications interface configured to receive the first route (e.g., route 200 of FIG. 2A) and, as explained in step 505 below, a second route (e.g., route 250 of FIG. 2A). For example, the communications interface may comprise a network interface controller and/or a transceiver (e.g., transceiver 105 of FIG. 1).

While traversing the first route (e.g., route 200 of FIG. 2A), the UAV (e.g., UAV 100 of FIG. 1) may receive deposits of currency at the associated locations. For example, the unmanned aerial vehicle (e.g., UAV 100) may include a locked storage (e.g., storage component 103 of FIG. 1) configured to receive currency deposited on the unmanned aerial vehicle (e.g., UAV 100).

At step 503, the processor (e.g., a processor of UAV 100 of FIG. 1) may receive, from at least one sensor (e.g., sensor 104 of FIG. 1) of the unmanned aerial vehicle (e.g., UAV 100), an indication that an amount of currency deposited at one of the associated locations (e.g., location 202 or 204 of FIG. 2A) is greater than the associated amount of currency. For example, as described above with respect to FIG. 1, the at least one sensor (e.g., sensor 104 of FIG. 1) may include at least one scale configured to measure weight of currency deposited on the unmanned aerial vehicle (e.g., UAV 100). In such embodiments, the indication may comprise a weight from the at least one scale heavier than an expected weight corresponding to the associated amount of currency. Additionally or alternatively, the at least one sensor (e.g., sensor 104 of FIG. 1) may include at least one of a bill counter and a coin counter.

At step 505, in response to the indication, the processor (e.g., a processor of UAV 100 of FIG. 1) may receive a second route (e.g., route 250 of FIG. 2A) including a subset of the plurality of requests. For example, the processor may transmit the indication (e.g., measurements from the at least one sensor (e.g., sensor 104 of FIG. 1), an amount of currency determined using the measurements, and/or a comparison between the determined amount of currency and the associated amount of currency) to a remote server (e.g., remote controller 113 of FIG. 1). In response, the remote server (e.g., controller 113 of FIG. 1) may transmit the second route (e.g., route 250 of FIG. 2A) to the UAV (e.g., UAV 100). Additionally with or alternatively to the subset, the second route (e.g., route 250 of FIG. 2A) may include one or more additional stops at a depository location (e.g., depository location 252 of FIG. 2A), as explained above with respect to FIG. 2A.

At step 507, using the associated control system, the processor (e.g., a processor of UAV 100 of FIG. 1) may navigate along the second route (e.g., route 250 of FIG. 2A). For example, the UAV (e.g., UAV 100) may navigate in step 507 similarly to the navigation performed in step 501.

Figure 6:
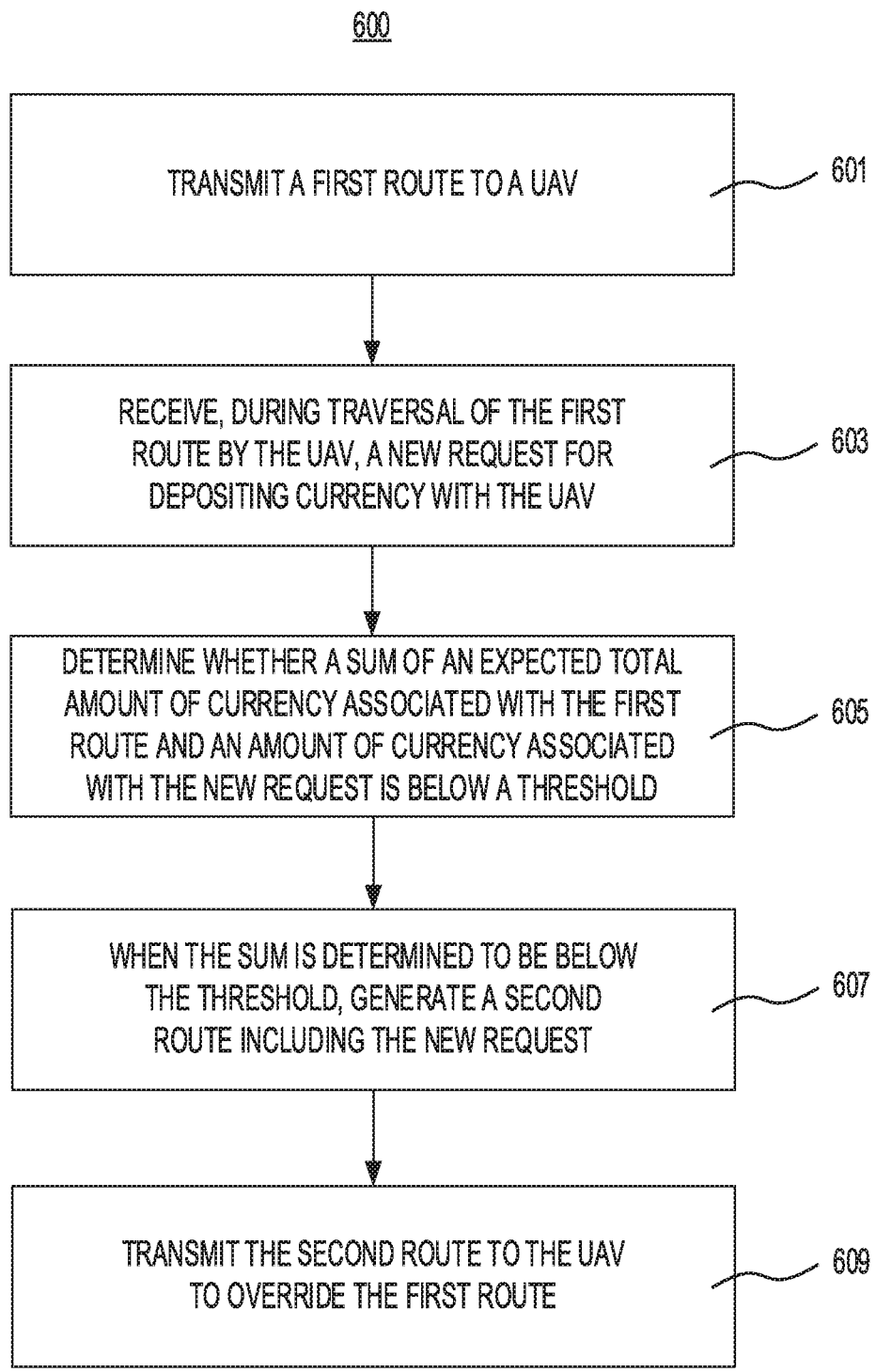
FIG. 6 is a flowchart of an exemplary method for re-routing an unmanned aerial vehicle to process a new depository request, consistent with embodiments of the present disclosure.

FIG. 6 is a flowchart of exemplary method 400 for automatically re-routing an unmanned aerial vehicle (e.g., UAV 100 of FIG. 1) based on a depository threshold. Exemplary method 600 may be implemented by, for example, one or more processors of UAV 100 of FIG. 1 and/or server 800 of FIG. 8 in communication with UAV 100 of FIG. 1. Exemplary method 400 may further be implemented using a general purpose computer or special purpose computer having at least one processor.

At step 601, the processor (e.g., processor 801 of server 800 of FIG. 8) may transmit a first route (e.g., route 300 of FIG. 3) to an unmanned aerial vehicle (e.g., UAV 100 of FIG. 1). The first route (e.g., route 300 of FIG. 3) may include at least one request (e.g., first request location 302, second request location 304, or the like of FIG. 3) for depositing currency with the unmanned aerial vehicle (e.g., UAV 100). Moreover, the first route (e.g., route 300 of FIG. 3) may have an associated expected total amount of currency below a depository threshold. For example, the expected total amount may comprise a sum of the amounts associated with the at least one request included in the first route (e.g., route 300 of FIG. 3).

In some embodiments, the processor (e.g., processor 801 of server 800 of FIG. 8) may transmit the first route (e.g., route 300 of FIG. 3) using one or more standards, such as 4G, LTE, WiFi, or the like over one or more computer networks. In such embodiments, the first route (e.g., route 300 of FIG. 3) may be encrypted. In some embodiments, the transmitted first route (e.g., route 300 of FIG. 3) may comprise a series of global positioning system (GPS) coordinates defining a path for the unmanned aerial vehicle (e.g., UAV 100).

In some embodiments, the processor (e.g., processor 801 of server 800 of FIG. 8) may first retrieve at least one request to deposit currency with the unmanned aerial vehicle (e.g., UAV 100) and generate the first route (e.g., route 300 of FIG. 3) including the at least one request. For example, the processor (e.g., processor 801 of server 800 of FIG. 8) may receive the requests, e.g., over a computer network (such as the Internet, a local area network (LAN), or the like) from devices associated with customers and store the requests for retrieval. Alternatively, a separate processor (e.g., associated with a different server) may receive the requests and store the requests for retrieval. Accordingly, retrieving the plurality of requests may comprise extracting the plurality of requests from an external storage device (e.g., database(s) 815 of FIG. 8) the plurality of requests previously received from a plurality of devices associated with customers. Additionally or alternatively, the requests may comprise a plurality of regularly scheduled pick-up with associated locations (e.g., location 302 or 304 of FIG. 3). Thus, an associated amount of currency for each request may comprise an amount included in the request or an amount determined from historical data, e.g., an average, a median, or other statistical determination from previous pick-ups at the associated locations (e.g., location 302 or 304 of FIG. 3).

Moreover, in such embodiments, the processor (e.g., processor 801 of server 800 of FIG. 8) may generate the first route (e.g., route 300 of FIG. 3) using at least one of Dijkstra's algorithm, a Bellman-Ford algorithm, an A* search algorithm, a Floyd-Warshall algorithm, Johnson's algorithm, a Viterbi algorithm, or the like. Thus, the first route (e.g., route 300) may comprise a shortest path passing through the locations (e.g. location 302 or 304 of FIG. 3) associated with the at least one request.

At step 603, the processor (e.g., processor 801 of server 800 of FIG. 8) may receive a new request for depositing currency with the unmanned aerial vehicle (e.g., UAV 100). For example, the processor (e.g., processor 801 of server 800 of FIG. 8) may receive the new request, e.g., over a computer network (such as the Internet, a local area network (LAN), or the like), from a device associated with a customer. Alternatively, a separate processor (e.g., associated with a different server) may receive the new request and forward the new request to the processor.

In some embodiments, the processor (e.g., processor 801 of server 800 of FIG. 8) may receive the new request during the traversal of the first route (e.g., route 300 of FIG. 3) by the unmanned aerial vehicle (e.g., UAV 100). For example, the processor (e.g., processor 801 of server 800 of FIG. 8) may determine whether the unmanned aerial vehicle (e.g., UAV 100) is traversing the first route (e.g., route 300 of FIG. 3) and proceed to step 605 only when the unmanned aerial vehicle (e.g., UAV 100) is determined to be traversing the first route (e.g., route 300 of FIG. 3). The processor (e.g., processor 801 of server 800 of FIG. 8) may make the determination based on a monitored location of the UAV (e.g., UAV 100), e.g., by requesting GPS coordinates from the UAV (e.g., UAV 100) at regular intervals.

At step 605, the processor (e.g., processor 801 of server 800 of FIG. 8) may determine whether a sum of the expected total amount of currency and an amount of currency associated with the new request is below the depository threshold. At step 607, when the sum is determined to be below the depository threshold, the processor (e.g., processor 801 of server 800 of FIG. 8) may generate a second route (e.g., route 350 of FIG. 3). The second route (e.g., route 350 of FIG. 3) may include the new request (e.g., new request location 352 of FIG. 3).

Similarly to the first route (e.g., route 300 of FIG. 3), the processor (e.g., processor 801 of server 800 of FIG. 8) may generate the second route (e.g., route 350 of FIG. 3) using at least one of Dijkstra's algorithm, a Bellman-Ford algorithm, an A* search algorithm, a Floyd-Warshall algorithm, Johnson's algorithm, a Viterbi algorithm, or the like. Thus, the second route (e.g., route 350 of FIG. 3) may comprise a shortest path passing through the locations (e.g., locations 302, 304, and/or 352 of FIG. 3) associated with the at least one request included in the first route (e.g., route 300 of FIG. 3) and the new request included in the second route (e.g., route 350 of FIG. 3) (e.g., as depicted in FIG. 3). The processor (e.g., processor 801 of server 800 of FIG. 8) may use the same algorithm(s) used to generate the first route (e.g., route 300 of FIG. 3) or may use one or more different algorithms.

At step 609, the processor (e.g., processor 801 of server 800 of FIG. 8) may transmit the second route (e.g., route 350 of FIG. 3) to the unmanned aerial vehicle (e.g., UAV 100) to override the first route (e.g., route 300 of FIG. 3). For example, the processor (e.g., processor 801 of server 800 of FIG. 8) may transmit the second route (e.g., route 350 of FIG. 3) using one or more standards, such as 4G, LTE, WiFi, or the like over one or more computer networks. In some embodiments, the second route (e.g., route 350 of FIG. 3) may be encrypted. Similarly to the first route (e.g., route 300 of FIG. 3), in some embodiments, the transmitted second route (e.g., route 350 of FIG. 3) may comprise a series of global positioning system (GPS) coordinates defining a path for the unmanned aerial vehicle (e.g., UAV 100).

Figure 7:
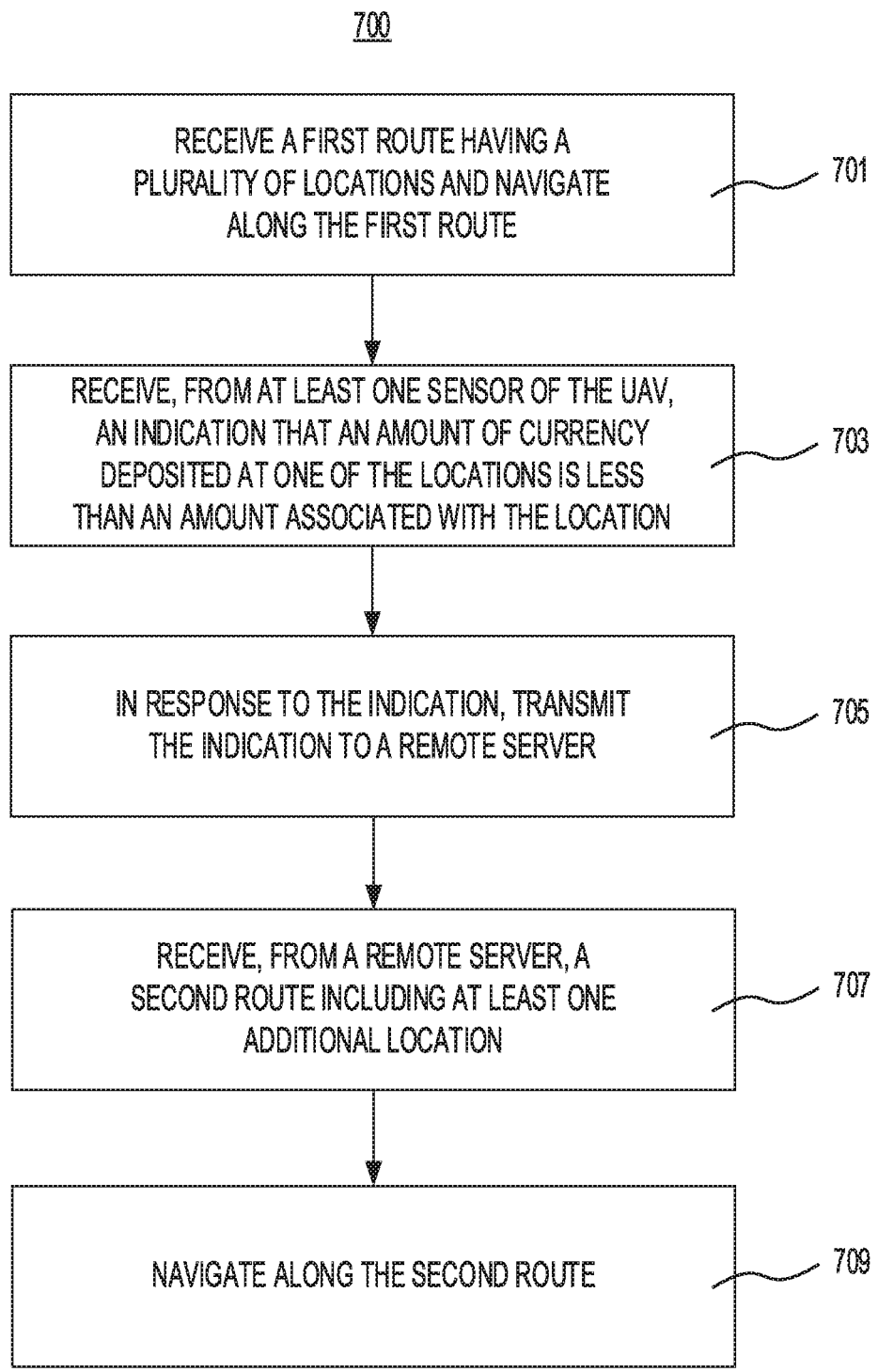
FIG. 7 is a flowchart of an exemplary method for navigating an unmanned aerial vehicle to process a new depository request, consistent with embodiments of the present disclosure.

FIG. 7 is a flowchart of exemplary method 700 for navigating an unmanned aerial vehicle (e.g., UAV 100 of FIG. 1) in response to a depository threshold. Exemplary method 700 may be implemented by, for example, one or more processors of UAV 100 of FIG. 1 and/or server 800 of FIG. 8 in communication with UAV 100 of FIG. 1. Exemplary method 700 may further be implemented using a general purpose computer or special purpose computer having at least one processor.

At step 701, the processor (e.g., a processor of UAV 100 of FIG. 1) may receive a first route (e.g., route 300 of FIG. 3) having a plurality of locations (e.g., first request location 302, second request location 304, or the like of FIG. 3). For example, the first route (e.g., route 300 of FIG. 3) may include a plurality of requests to deposit currency with the unmanned aerial vehicle (e.g., UAV 100), each request having an associated location (e.g., location 302 or 304 of FIG. 3). For example, the processor (e.g., a processor of UAV 100 of FIG. 1) may receive the first route (e.g., route 300 of FIG. 3) from a remote server (e.g., remote controller 113 of FIG. 1). In some embodiments, each request may have an associated amount of currency.

The processor (e.g., a processor of UAV 100 of FIG. 1) may receive the first route (e.g., route 300 of FIG. 3) using one or more standards, such as 4G, LTE, WiFi, or the like over one or more computer networks. In some embodiments, the first route (e.g., route 300 of FIG. 3) may be encrypted. In some embodiments, the received first route (e.g., route 300 of FIG. 3) may comprise a series of global positioning system (GPS) coordinates defining a path for the unmanned aerial vehicle (e.g., UAV 100).

Further at step 701, the processor (e.g., a processor of UAV 100 of FIG. 1) may, using an associated control system, navigate along the first route (e.g., route 300 of FIG. 3) using at least one rotor. For example, as explained above with respect to FIG. 1, the processor (e.g., a processor of UAV 100 of FIG. 1) may use at least one rotor (e.g., rotor 109a, 109b, 109c, and/or 109d) of the UAV (e.g., UAV 100) to navigate. As explained above with respect to FIG. 1, the at least one rotor may comprise a part of an electric motor and/or a part of a fuel combustion engine. Additionally or alternatively, the at least one rotor may drive at least one propeller (e.g., propellers 111a, 111b, 111c, and/or 111d of FIG. 1) of the unmanned aerial vehicle (e.g., UAV 100).

In some embodiments, the associated control system may include a navigational system comprises a global positioning system (GPS) component and a communications interface configured to receive the first route (e.g., route 300 of FIG. 3) and, as explained in step 707 below, a second route (e.g., route 350 of FIG. 3). For example, the communications interface may comprise a network interface controller and/or a transceiver (e.g., transceiver 105 of FIG. 1).

While traversing the first route (e.g., route 300 of FIG. 3), the UAV (e.g., UAV 100 of FIG. 1) may receive deposits of currency at the associated locations. For example, the unmanned aerial vehicle (e.g., UAV 100) may include a locked storage (e.g., storage component 103 of FIG. 1) configured to receive currency deposited on the unmanned aerial vehicle (e.g., UAV 100).

At step 703, the processor (e.g., a processor of UAV 100 of FIG. 1) may receive, from at least one sensor (e.g., sensor 104 of FIG. 1) of the unmanned aerial vehicle (e.g., UAV 100), an indication that an amount of currency deposited at one of the associated locations (e.g., location 302 or 304 of FIG. 3) is less than the associated amount of currency For example, as described above with respect to FIG. 1, the at least one sensor (e.g., sensor 104) may include at least one scale configured to measure weight of currency deposited on the unmanned aerial. In such embodiments, the indication may comprise a weight from the at least one scale lighter than an expected weight corresponding to the associated amount of currency. Additionally or alternatively, the at least one sensor (e.g., sensor 104) may include at least one of a bill counter and a coin counter.

At step 705, in response to the indication, the processor (e.g., a processor of UAV 100 of FIG. 1) may transmit the indication to the remote server (e.g., controller 113 of FIG. 1). For example, the processor may transmit measurements from the at least one sensor (e.g., sensor 104), an amount of currency determined using the measurements, and/or a comparison between the determined amount of currency and the associated amount of currency to the remote server (e.g., remote controller 113 of FIG. 1).

At step 707, the processor (e.g., a processor of UAV 100 of FIG. 1) may receive, from a remote server (e.g., remote controller 113 of FIG. 1), a second route (e.g., second route 350 of FIG. 3) including at least one additional location (e.g., new request location 352 of FIG. 3). For example, the processor may receive the second route (e.g., route 350 of FIG. 3) in response to the indication transmitted in step 705.

At step 709, using the associated control system, the processor (e.g., a processor of UAV 100 of FIG. 1) may navigate along the second route (e.g., route 350 of FIG. 1). For example, the UAV (e.g., UAV 100) may navigate in step 709 similarly to the navigation performed in step 701.

FIG. 8 is a depiction of an example server 800 for routing and re-routing an unmanned aerial vehicle (e.g., UAV 100 of FIG. 1). Server 800 of FIG. 8 may therefore be in communication with the UAV 100. As depicted in FIG. 8, server 800 may have a processor 801. Processor 801 may comprise a single processor or a plurality of processors. For example, processor 801 may comprise a CPU, a GPU, a reconfigurable array (e.g., an FPGA or other ASIC), or the like.

Processor 801 may be in operable connection with a memory 803, an input/output module 805, and a network interface controller (NIC) 807. Memory 803 may comprise a single memory or a plurality of memories. In addition, memory 803 may comprise volatile memory, non-volatile memory, or a combination thereof. As depicted in FIG. 8, memory 803 may store one or more operating systems 809 and a routing algorithm 811. For example, routing algorithm 811 may include instructions to execute all or part of method 400 of FIG. 4 and/or method 600 of FIG. 6.

Input/output module 805 may store and retrieve data from one or more databases 815. For example, database(s) 815 may include one or more routing algorithms (e.g., algorithm 811), one or more maps used by algorithm 811, and/or one or more requests previously received from devices associated with customers, as described above. Accordingly, database(s) 815 may comprise a storage device from which requests may be retrieved (e.g., by processor 801 and/or by a UAV, such as UAV 100, communicating with server 800). Database(s) 815 may comprise a memory (e.g., a volatile or non-volatile memory) or any other non-transitory medium.

NIC 807 may connect server 800 to one or more computer networks. In the example of FIG. 8, NIC 807 connects server 800 to the Internet. Server 800 may receive data and instructions over a network using NIC 807 and may transmit data and instructions over a network using NIC 807. Moreover, server 800 may receive requests from devices associated with customers over a network using NIC 807, as described above. For example, as depicted in FIG. 8, server 800 may receive requests from customer device 817 using a computer network (such as the Internet). Although depicted as a smartphone in FIG. 8, customer device 817 may additionally or alternatively comprise a smartphone, a laptop, a tablet, or the like.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A method for automatically re-routing an unmanned aerial vehicle, comprising steps of:
   retrieving a plurality of requests to deposit currency using the unmanned aerial vehicle;
   generating a first route including at least two of the plurality of requests wherein an associated expected total amount of currency is less than a depository threshold;
   transmitting the first route to the unmanned aerial vehicle;
   receiving, from the unmanned aerial vehicle, an indication that an amount of currency collected at a location associated with one of the at least two requests is greater than an amount of currency included in the request associated with the location;
   revising the expected total amount of currency associated with the first route in accordance with the received indication;
   generating a second route having an associated expected total amount of currency below the depository threshold; and
   transmitting the second route to the unmanned aerial vehicle to override the first route.

2. The method of claim 1, wherein the second route includes a stop at a depository location prior to stopping at locations included in the first route but not yet visited by the unmanned aerial vehicle.

3. The method of claim 1, wherein at least one of the first route and the second route is generated using at least one of Dijkstra's algorithm, a Bellman-Ford algorithm, an A* search algorithm, a Floyd-Warshall algorithm, Johnson's algorithm, or a Viterbi algorithm.

4. The method of claim 3, wherein at least one of the first route and the second route comprise a shortest path.

5. The method of claim 1, wherein the steps further comprise receiving the plurality of requests over a computer network from a plurality of devices associated with customers and storing the received plurality of requests in a storage device.

6. The method of claim 1, wherein retrieving the plurality of requests comprises extracting the plurality of requests from a storage device storing the plurality of requests previously received from a plurality of devices associated with customers.

7. The method of claim 1, wherein the transmitted first route comprises a series of global positioning system (GPS) coordinates defining a path for the unmanned aerial vehicle.

8. The method of claim 1, wherein the transmitted second route comprises a series of global positioning system (GPS) coordinates defining a path for the unmanned aerial vehicle.

9. The method of claim 1, wherein the steps further comprise monitoring global positioning system (GPS) coordinates of a current location of the unmanned aerial vehicle during traversal of the first route.

10. The method of claim 9, wherein the steps further comprise requesting an indication of an amount of currency collected at a location associated with one of the at least two requests when the GPS coordinates are within a distance threshold of the location.

11. An unmanned aerial vehicle, comprising:
    at least one rotor having an associated control system;
    at least one storage compartment;
    at least one memory storing instructions; and
    at least one processor configured to execute the instructions to perform operations comprising:
       receiving a first route including a plurality of requests to deposit currency with the unmanned aerial vehicle, each request having an associated location along the first route and an associated amount of currency;
       using the associated control system, navigating along the first route using the at least one rotor;
       determining an amount of currency deposited in the at least one storage compartment;
       receiving a second route including a subset of the plurality of requests, based on the determined amount; and
       using the associated control system, navigating along the second route using the at least one rotor.

12. The unmanned aerial vehicle of claim 11, wherein the at least one rotor comprises a part of an electric motor.

13. The unmanned aerial vehicle of claim 11, wherein the at least one rotor comprises a part of a fuel combustion engine.

14. The unmanned aerial vehicle of claim 11, wherein the at least one rotor drives at least one propeller of the unmanned aerial vehicle.

15. The unmanned aerial vehicle of claim 11, wherein the associated control system includes a navigational system comprises a global positioning system (GPS) component and a communications interface configured to receive the first route and the second route.

16. The unmanned aerial vehicle of claim 11, wherein the at least one storage compartment includes at least one scale configured to measure weight of currency deposited on the unmanned aerial vehicle.

17. The unmanned aerial vehicle of claim 11, wherein the at least one storage compartment comprises a safe.

18. The unmanned aerial vehicle of claim 17, wherein the at least one storage compartment requires a key, a passcode, or a biometric scan for access.

19. The unmanned aerial vehicle of claim 11, wherein the storage compartment further comprises a sensor configured to determine amount of currency deposited on the unmanned aerial vehicle.

20. A method for automatically re-routing an unmanned aerial vehicle, comprising:

retrieving a plurality of requests to deposit currency with the unmanned aerial vehicle, each request having an associated location and an associated amount of currency;

generating a first route including at least two of the plurality of requests;

transmitting the first route to the unmanned aerial vehicle;

monitoring a location of the unmanned aerial vehicle along the first route;

requesting an indication of an amount of currency deposited from the unmanned aerial vehicle, based on a location threshold of an associated location of one of the at least two of the plurality of requests;

in response to the request, receiving, from the unmanned aerial vehicle, an indication of the amount of currency deposited;

determining whether a difference between the amount of currency deposited and the amount of currency associated with the location exceeds a depository threshold, based on the amount of currency deposited and the amount of currency associated with the location;

generating a second route including fewer requests than the first route, based on the determined difference; and transmitting the second route to the unmanned aerial vehicle to override the first route.

* * * * *